Patented Dec. 15, 1953

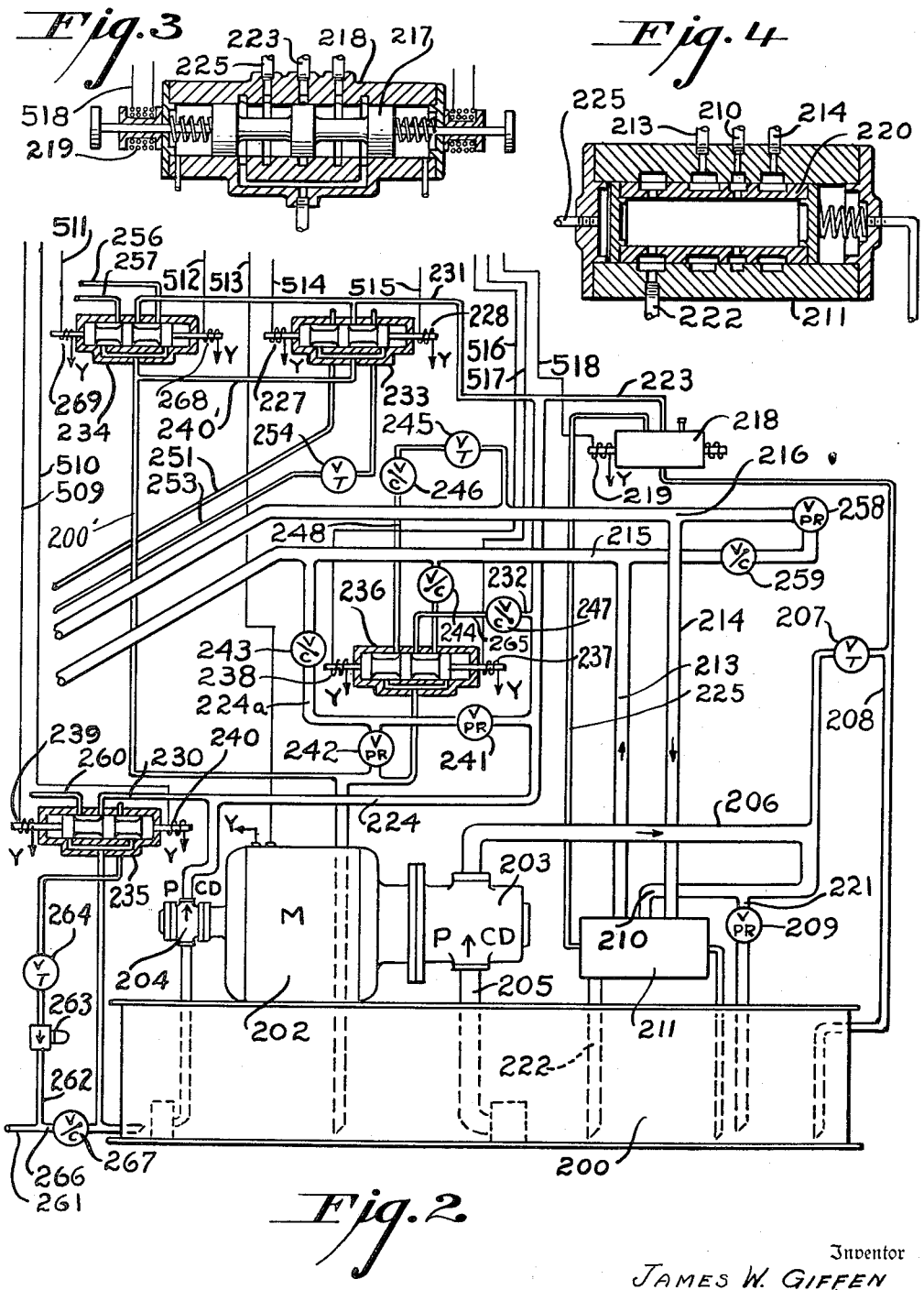

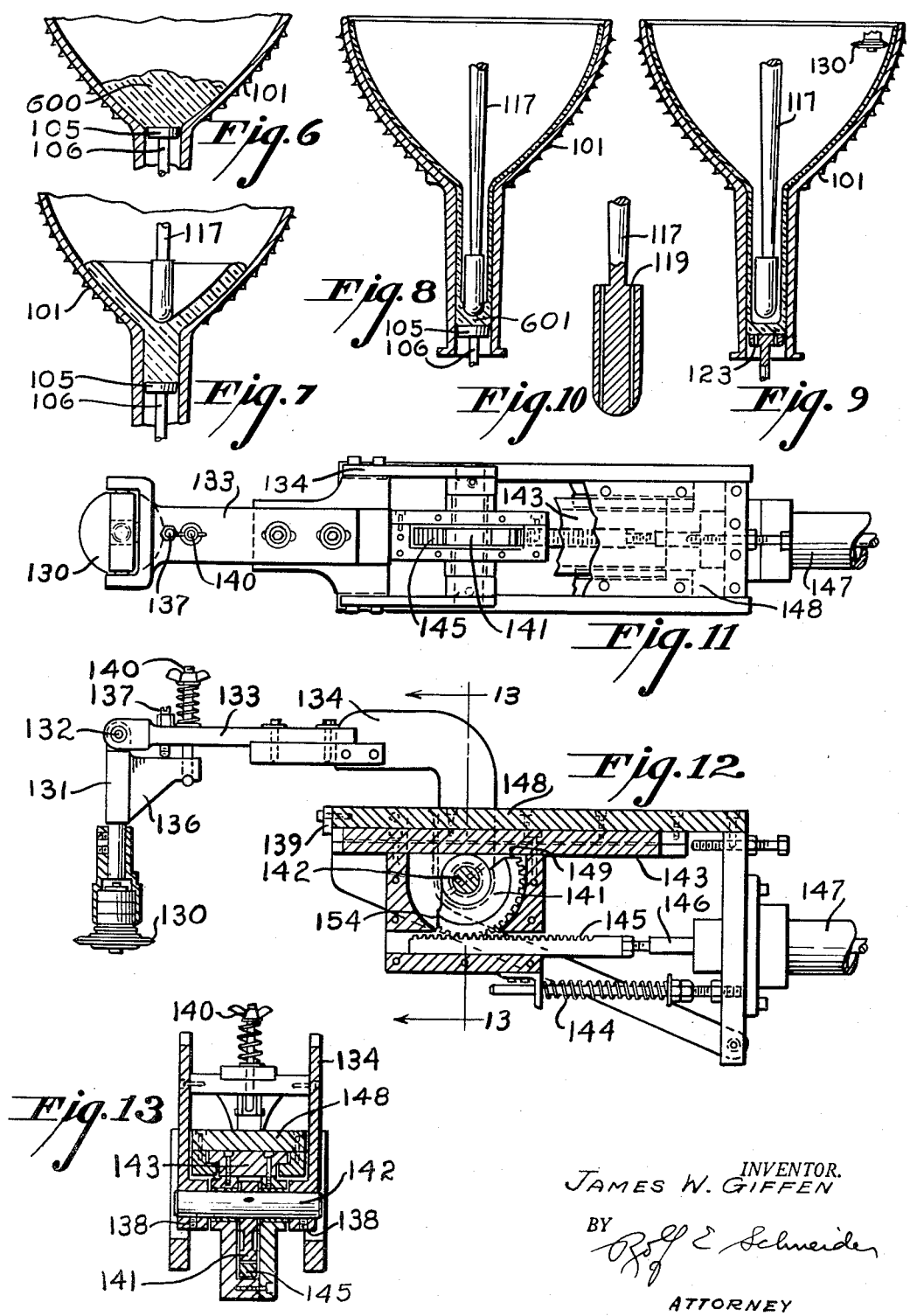

2,662,346

UNITED STATES PATENT OFFICE 2,662,346

METHOD AND APPARATUS FOR FORMING GLASS

James W. Giffen, Corning, N. Y., assignor to Corning Glass Works, Corning, N. Y., a corporation of New York Application August 1, 1949, Serial No. 107,945

40 Claims. (Cl. 49—29)

1

The present invention relates to the manufacture of hollow articles of glassware and is particularly directed to the production of tubulated glass articles and tubular glass articles.

In the fabrication of tubulated glass articles such as funnel tubes and television tube blanks according to customary practice, it is necessary first to form the funnel portion and the tubulation individually and then to seal these separately manufactured parts together. Such practice involves not only the obvious disadvantage of individual formation of the several parts, but also requires that such parts, as well as the tubulated article, be separately annealed and otherwise handled. This procedure, moreover, is subject to considerable loss in the sealing operation itself because of such factors as improper formation of the parts, inadequate sealing of the parts, and the like, that are difficult to entirely eliminate.

According to the present invention, these disadvantages can be overcome and a tubulated glass article produced as an integral unit in a single operation by fabricating the article with the aid of centrifugal action. In the practice of the invention, a charge of molten glass is deposited in a hollow mold provided with a tubular portion, and the mold is rotated about the axis of its tubular portion to centrifugally distribute molten glass over the walls thereof. Advantageously the mold is arranged with its tubular portion vertical, and the glass charge is initially positioned over the mouth of the tubular portion. During rotation of the mold a differential pressure, preferably obtained at least in part by the creation of a negative pressure within the tubular portion, is applied to the glass charge to force a controlled amount of molten glass into the tubular portion for formation of the desired tubulation; and a glassworking tool is advantageously introduced into the tubular portion to laterally extrude and distribute the glass forced thereinto in tubular form lengthwise along the wall thereof. When the centrifugal formation of the article has been completed, and while the glass is still workable, the outer portion thereof may be suitably trimmed to eliminate excess glass.

The present invention is also applicable to the production of a tubular glass article, in the formation of which in accordance therewith a charge of molten glass is moved longitudinally within a tubular mold having a cross-section corresponding to that of the desired article, and is subjected to lateral extrusion during such movement. As with the formation of the tubulated article, a glassworking tool is preferably introduced into the mold and the mold is advantageously rotated to

2 assist in the lateral extrusion and distribution of the glass in tubular form over the mold wall.

The invention will now be described in detail in connection with the accompanying drawings, of which:

Fig. 1, and Fig. 2 which is a continuation of and should be arranged to the right of Fig. 1, comprise an elevation partly in section and partly diagrammatically of a glassworking system embodying the present invention, together with hydraulic power and control equipment for the operation thereof.

Figs. 3 and 4 are enlarged sectional views of the high-speed pilot valve and the high-speed valve forming part of the power and control equipment shown in Fig. 2.

Fig. 5 diagrammatically illustrates the timing circuits for the control of the operation of the glassworking system shown in Figs. 1 and 2.

Figs. 6 to 9 are enlarged sectional elevations of the mold shown in Fig. 1, and illustrate the progressive manipulation of a molten glass charge therein and the formation of an article therefrom with the aid of a glass-distributing tool.

Fig. 10 is an enlarged fragmentary view, partly in section, of the glass-distributing tool.

Fig. 11 is an enlarged plan view of the arrangement shown in Fig. 1 for trimming of the centrifugally formed article.

Fig. 12 is an elevation, partly in section, of the trimming arrangement shown in Fig. 11.

Fig. 13 is a sectional view taken along the line 13—13 in Fig. 12.

Operation in brief

Figure 1:
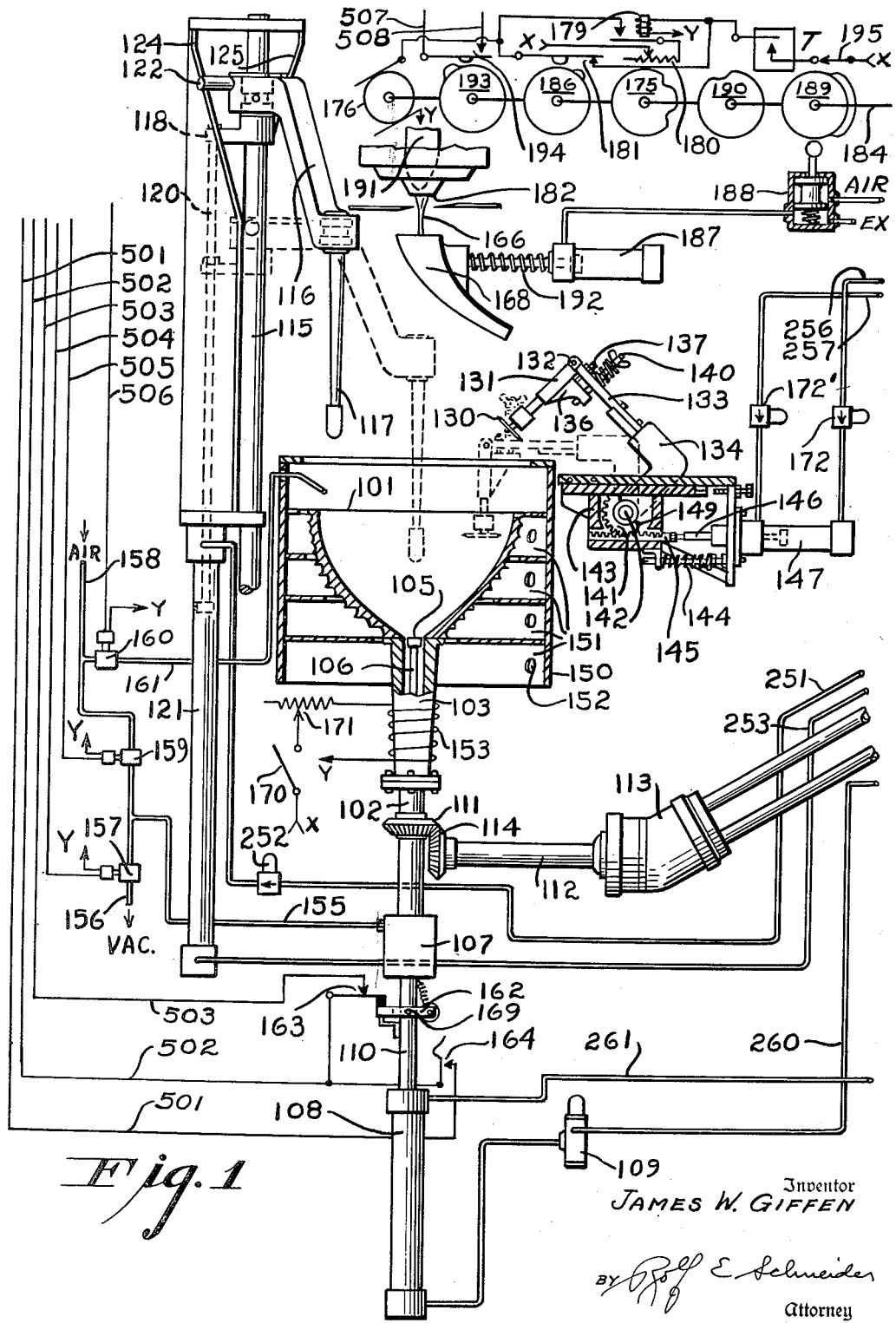
Figure 5:
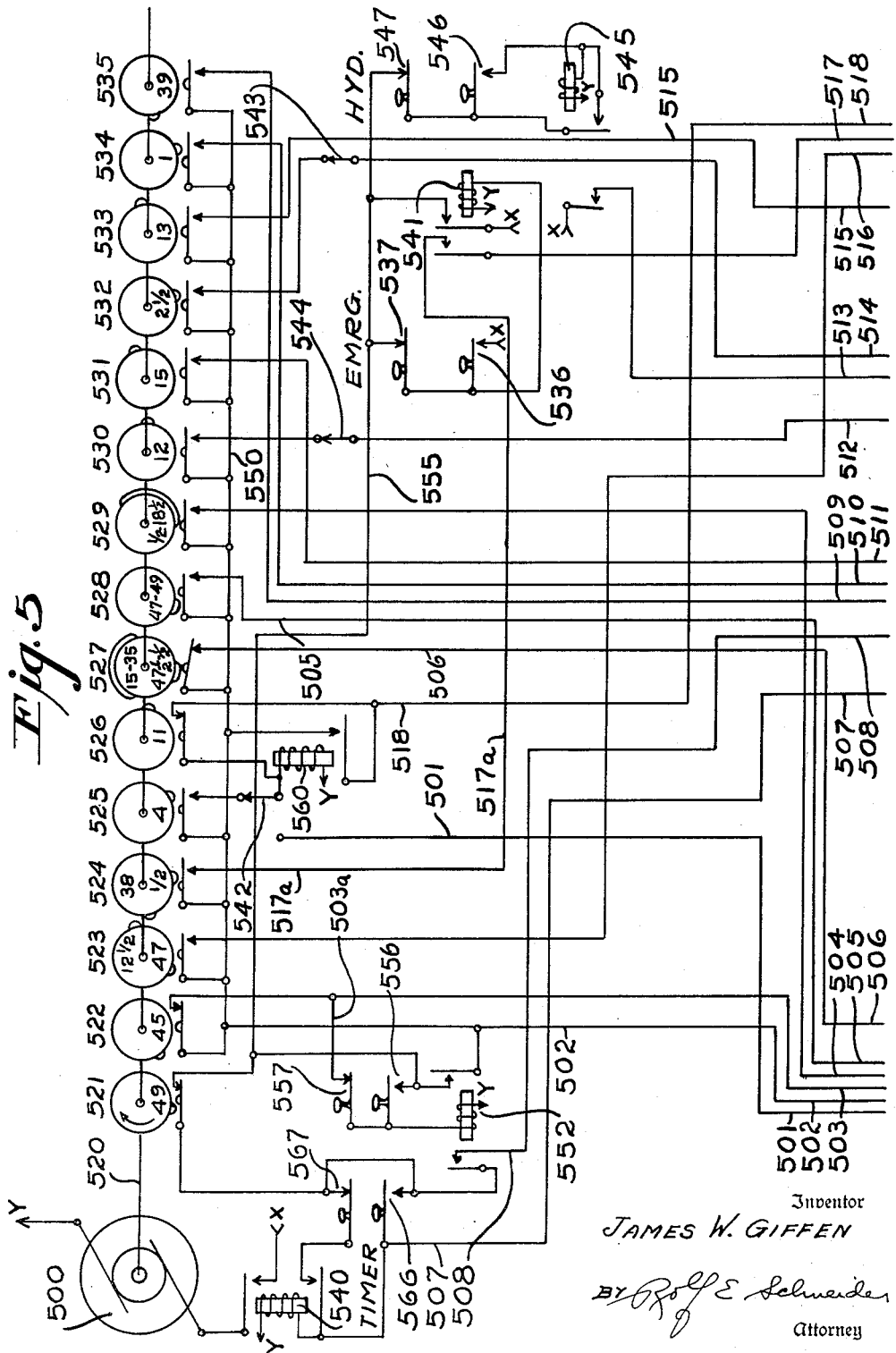

In accordance with the present invention, a timer or clock T (Fig. 1) initiates the operation of a feeder under whose control a charge of molten glass is deposited in the cavity of a hollow open-ended mold 101 corresponding in form to that of the desired tubulated article. Upon rotation of the mold, which is preferably arranged vertically, the charge is distributed evenly and uniformly over the wall surfaces of the mold by centrifugal force set up in the molten glass itself. A differential pressure, desirably obtained by the creation of a negative pressure in the tubular portion of the mold, is advantageously utilized to introduce glass thereinto, and a retractable valve member 105, similar in form to a conventional knockout valve and hereinafter sometimes referred to simply as a "valve," is provided to control the volume of glass introduced into the tubular portion. Such glass is subsequently laterally squeezed or extruded from between such valve and a second tool 117, hereinafter referred to as a "distributor" and adapted to be controllably introduced into the tubular portion, as both the valve and the distributor are moved within such tubular portion, to effect lengthwise distribution of glass in tubular form along the surface thereof with the aid of the centrifugal force generated by the rotation of the mold. After the article has been formed, a trimmer assembly moves a grooving disc 130 into the cavity of the mold 101 to suitably groove the article along a desired line of severance for subsequent severance of the excess glass by thermal shear, as more fully described and claimed in the copending application of Jay C. Overmyer and myself, Serial No. 107,946, filed concurrently herewith, now Patent No. 2,629,206 issued February 24, 1953. The article is then automatically elevated by valve 105 for convenient and ready removal from the mold. Substantially the same sequence of operations is followed in the production of a tubular article, in which case the aforementioned mold cavity may be entirely omitted or may be made just sufficiently large to facilitate the introduction of the molten glass charge into the tubular mold. In either event, these operations are effected under the control of the timing system shown in Fig. 5, an operating cycle of which is initiated by the closure of contacts 194 actuated by the glass-feeding apparatus (Fig. 1.)

Glassworking equipment

Referring to the drawings in detail, the mold 101 may be designed, as in the present instance, for use in the integral and unitary manufacture of the tubulated and flared portions of a television tube or similar cathode ray tube envelope. The mold is secured to the top end of a tubular shaft 102 with its tubular portion 103 coextensive with the bore of the shaft. Occupying the bore of such tubular portion is the valve 105, which is provided with a plurality of air passages 123 (Fig. 9) to assure the creation of a negative pressure thereabove when a vacuum line 156 is in communication with the lower end of the tubular portion 103, as will be described later. Valve 105 is supported on a rod 106 passing down through the bore of shaft 102 and through a stuffing box 107, and connected to an operating rod 110 of a hydraulic unit 108. A cam 162, pivoted at 169 on rod 110, turns about its pivot when engaging contacts 164 during the upward travel of valve 105, and therefore does not operate such contacts. In the "up" position of the valve 105 cam 162 closes contacts 163 in a holding circuit for relay 552 (Fig. 5), the purpose of which is hereinafter described. During its downward movement cam 162 closes contacts 164 in an energizing circuit for the high-speed relay 560 (Fig. 5), used only during the warming-up operations, as described hereinafter. As will be brought out later, by means of hydraulic fluid supplied to the unit 108 through a counterbalance valve 109, the knockout valve 105 is normally retained in its "up" position at the inner end of the bore of tubular portion 103, as shown. The mold-supporting shaft 102 is provided with a miter gear 111 in mesh with a miter gear 114 carried on one end of a drive shaft 112 of a hydraulic motor 113 by means of which the mold 101 is rotated, as will be hereinafter more fully explained.

Arranged alongside the mold 101 is a distributor-support column 115 upon which is slidably arranged an arm 116. Rotatably suspended from the free end of arm 116 is the distributor 117, which, at its lower end, as illustrated in Fig. 10, has an enlarged portion with air passages 119 therethrough. A bracket 118 coupled to arm 116 is secured to the top end of the actuating rod 120 of a hydraulic operating unit 121, by means of which the distributor 117 may be raised or lowered, as will be explained later. Arm 116 is provided with a guide rod 122 transverse to the column 115, arranged to engage cam tracks 124 and 125 which are shaped to bring the distributor 117 from a normal position laterally disposed from and above the mold 101, first into alignment with the axis of the tubular portion 103 of the mold, and to then hold it in alignment therewith as the distributor is lowered thereinto.

Trimmer assembly

An article centrifugally formed in the mold 101 generally lacks uniformity in height, and accordingly its top edge is desirably trimmed. This is accomplished by means of the disc 130 which is brought into the mold 101 and into engagement with the glass preferably while the mold is still rotating and while the glass is still workable, to form a groove of sufficient depth to effect subsequent severance by thermal shear along a desired line of fracture in the manner described in the aforementioned copending application Serial No. 107,946. Disc 130 is rotatably carried at the bottom end of a support 131 pivoted at 132 on the outer end of a support 133 extending from one end of an elbow 134. The disc support 131 is provided with a bracket 136 adapted to engage a stop 137 adjustable to set disc 130 at a position such that its edge will be normal to the glass surface it is to engage. A spring-loaded link 140 between the bracket 136 and support 133 resiliently holds the bracket against stop 137.

Elbow 134, at its lower end, is pierced to accommodate a transverse shaft 142 fixed thereto by set screws 138 (Fig. 13). Shaft 142 also passes through a carrier 143 slidably supported in a frame 148 and normally held against a stop 139 (Fig. 12) by a spring 144. A sector gear 141 fixedly carried on shaft 142 is in mesh with a rack 145 fixed to the operating rod 146 of a hydraulic unit 147. By moving rack 145 back and forth, the necessary turning movement is given to the gear 141 to swing the elbow 134 and its supported parts between the in-the-mold and out-of-the-mold positions, as shown in Fig. 1. Flats 149 and 154 (Fig. 12) on gear 141 engage the undersurface of carrier 143 to definitely limit the extent to which gear 141 may be turned in either direction.

When gear 141 is turned counter-clockwise, and following engagement of flat 149 with the carrier 143, the carrier moves away from stop 139 against the tension of spring 144, thus enabling disc 130 to imbed itself in the wall of the article to form an annular groove therein as the article is rotated, as more fully described later. During the initial movement of rack 145 in the reverse direction, spring 144 slides the carrier 143 into engagement with stop 139 to clear disc 130 from the groove formed in the article, after which the gear 141 is turned until its flat 154 engages the carrier. Operation of unit 147 is under the joint control of the timing and hydraulic equipment and will also be subsequently described.

This trimmer assembly is specifically claimed in my divisional application Serial No. 258,935 filed November 29, 1951.

Temperature control

In order to maintain the mold 101 at the requisite operating temperature it is surrounded by a housing 150 having a number of compartments 151 into which cooling air can be supplied through suitable openings, such as the opening 152. The lower end of the tubular portion 103 of the mold is ordinarily not heated sufficiently by the glass for satisfactory operation, and accordingly it is surrounded with a heating winding 153. The circuit for winding 153 extends from an X terminal of a suitable current source, through switch 170, rheostat 171, and the heating element 153 to a Y terminal of the same current source.

*Formation of article*

In the formation of an article, charging of the tubular portion with molten glass previously deposited in the mold may be effected by gravity, but is preferably and more quickly effected by creating a vacuum in the bore of the tubular portion. This is accomplished by connecting pipe 155 to the vacuum line 156 through a suitable magnetic valve 157, which is opened only during the time that an article is being formed. Where a tubular article is being formed, the same procedure is advantageously employed for introducing molten glass into and moving it longitudinally within the tubular mold.

In the operation of the equipment it sometimes occurs that an article breaks in the mold, and in order to readily blow air through the tubular portion to remove small particles of glass therefrom, the pipe 155 is also connected to a compressed air line 158 through a normally closed magnetic valve 159. A second normally closed valve 160 when opened passes air through a pipe 161 having its open end directed toward the top inner edge of mold 101 at one time to free an article therefrom, and later to effect mold cooling. Valves 157, 159, and 160 are operated under control of the timing equipment, as will be explained later.

*Feeder equipment and its operation*

Feeder equipment for supplying the mold 101 with charges of molten glass may be of the character of that shown and described in Peiler Patent No. 1,760,254, granted May 27, 1930, modified to meet the special needs of the glassworking equipment herein disclosed. It is herein assumed that the Peiler feeder is employed with the conventional shear cam on cam shaft 184 replaced by a cam 175 adapted to effect two operations of the shears for each operation of the gobbing needle 191 as for example in the manner described and claimed in the copending application of Roy N. Sundstrom, Serial No. 80,917 filed March 11, 1949, now Patent No. 2,593,499 issued April 22, 1952, and with an intermittently operated drive motor 176 having a built-in brake substituted for the usually provided, continuously operated motor.

A feeding cycle is initiated by the momentary closure of the contacts of a timer or clock T which closes the operating circuit of a feeder start relay 179. The circuit extends from an X terminal of a suitable current source, through a switch 195, the contacts of T, and the winding of relay 179 to a Y terminal of the same source. Relay 179, upon operating, completes an operating circuit for motor 176 extending from an X terminal of a current source through a rheostat 180, the contacts of relay 179, and through motor 176 to a Y terminal of the same current source. Relay 179 also completes a locking circuit for itself, including cam-actuated contacts 181 and the rheostat 180. A cam 186 separates contacts 181 just before shaft 184 has completed a revolution, thus effecting the release of relay 179, which in turns opens the traced operating circuit of motor 176. By the time motor 176 has been stopped, the cam 186 has reached its original position.

At the beginning of a revolution of shaft 184, shear cam 175 effects the shearing of the glass stream 166, which issues from the feeder outlet 182 and is diverted to a cullet container by a chute 168 during the period between feeding cycles. Chute 168 is adapted to be removed from under the feeder outlet 182 by a pneumatic unit 187 under control of a valve 188. Valve 188 is operated by a cam 189 just after stream 166, issuing from feeder outlet 182, is sheared, and is held operated until after the needle cam 190 has passed through its cycle of operation to actuate needle 191 to form a gob, and the shear cam 175 has effected shearing of the gob and thus released it into mold 101. After gob delivery, valve 188 is permitted to restore, enabling a spring 192 to restore chute 168 under the feeder. A cam 193 closes contacts 194 in the timing equipment start-circuit in time to start rotation of mold 101 just after it receives the glass charge. This circuit will be traced later.

*Hydraulic equipment and its use*

A pump 203 withdraws fluid from a tank 200 via an intake pipe 205 to supply motor 113 with operating fluid at the high pressures necessary to rotate mold 101 at speeds suitable for centrifugally forming glass articles therein. Fluid from pump 203 is supplied to motor 113 under control of a high-speed two-way valve 211 (shown in section in Fig. 4), which in turn is under control of a four-way pilot valve 218 (shown in section in Fig. 3) used as two-way valve and having an operating magnet 219 under control of the timing equipment.

High-speed control valve 211 normally has its valving spool 220 in the position shown in Fig. 4, in which position pipes 213 and 214 extending therefrom to motor 113 are blocked and a pipe 210 receiving the fluid from pump 203 via pipe 206 is in communication with the interior of spool 220, which in turn is open to a fluid return pipe 222. Part of the fluid pumped into pipe 206 also passes directly through a throttle valve 207 to a fluid return pipe 208; accordingly, with valve 211 in its normal position, the pump 203 merely circulates fluid over the paths traced.

When the operating magnet 219 of pilot valve 218 is energized, its spool 217 moves to the right (as viewed in Fig. 3) enabling it to pass fluid under low pressure supplied by pump 204 through a branch 223 of pipe 224, into a pipe 225 connected with the left end of valve 211 (as viewed in Figs. 2 and 4) so that its spool 220 moves to the right. With valve 211 operated, fluid supplied by pipe 210 from pump 203 passes through the valve to pipe 213, and through pipe 215 to motor 113, and returns to the tank 200 via pipes 216 and 214, and through the valve spool 220 and return pipe 222. The rate of acceleration of motor 113 is controlled by the adjustment of an acceleration control relief valve 209 in a branch 221 of pipe 210. The high speed of the motor 113 is controlled by the throttle valve 207 which, as it is opened wider, diverts more fluid directly to the tank 200, thus reducing the amount of fluid available for operating motor 113, thereby reducing its speed.

Pump 204, in addition to supplying fluid at low pressure to operate valve 211, also via branch 230 of pipe 224 feeds operating fluid through four-way valve 235 to the knockout valve hydraulic unit 108; by way of its branch 231 feeds operating fluid through four-way valves 233 and 234 to the distributor and trimmer hydraulic units 121 and 147 respectively; and by way of its branch 232 feeds operating fluid through a check valve 247, four-way valve 236, and a check valve 244 to pipe 215 to operate motor 113 at low speed. Four-way valves 233—236 are similar to the valve 218 (Fig. 3) except that they have no spool centering springs, their spools being moved back and forth by their respective operating magnets, and accordingly each of these valves is always feeding fluid to one end or the other of its hydraulic unit, at which time it connects the other end of its unit to a fluid-return pipe. The fluid-return path from motor 113 is through pipe 216, a throttle valve 245, a check valve 246, pipe 248, and through valve 236 back to tank 200. When the spool of valve 236 is to the right (as viewed in Fig. 2), the traced fluid supply path is closed and the return pipe 248 is brought into communication with pipe 265. Check valve 247 serves to prevent entry of fluid into the low-pressure pipe 224 when high-pressure fluid is being supplied to the motor 113. The fluid return path from valve 233 is through pipes 240' and 200' the latter of which also provides the return path for fluid from valves 234 and 236.

Whenever the speed of motor 113 is being reduced, as is the case when either traced fluid supply path is closed, the motor operates for a short time as a pump, during which time it simply circulates fluid within pipes 215 and 216 via a deceleration control valve 258 and a check valve 259. For smooth deceleration of motor 113 it is essential that the motor and the pipes 215 and 216 remain completely filled with fluid. To insure this in spite of possible leakages, a branch 224a from pipe 224 supplies fluid at a reduced pressure to pipe 215 via a pressure-reducing valve 241 and a check valve 243. A pressure relief valve 242 connects the portion of pipe 224a between valves 241 and 243 with tank 200 to control pressure in pipe 224a. Valve 243 prevents the fluid supplied to pipe 215 by either pump 203 or 204 from returning to tank 200 without having first passed through motor 113.

As previously mentioned, each of the four-way valves 233, 234, and 235 in the usual fashion is at all times supplying fluid to one end of its hydraulic unit and simultaneously connects the opposite end of the unit to a fluid-return pipe. The pipe 251, extending between valve 233 and the top of distributor unit 121, includes a speed-control valve 252 so as to limit the speed of upward movement of distributor 117. The pipe 253, extending between the valve 233 and the bottom end of unit 121, includes a throttle valve 254 for regulating the "down" movement of the distributor.

Pipes 256 and 257, extending between valve 234 and the trimmer hydraulic unit 147, contain speed-regulating valves 172 and 172' respectively. Pipe 260, extending between valve 235 and the bottom of the hydraulic unit 108, includes a counterbalance valve 109 which traps fluid in the bottom of unit 108 to hold knockout valve 105 in its "up" position. Pipe 261, extending from the top of unit 108, has a branch 262 extending to valve 235 and including a speed-regulating valve 263 for speed control of knockout valve 105 during its upward movement only, and a throttle valve 264 through the medium of which only the rate at which knockout valve 105 may be lowered by unit 108 can be suitably controlled. A fluid-return branch 266 of pipe 261 includes a check valve 267 which enables fluid to be drawn into the top end of unit 108 while its operating rod 106 is being lowered through the medium of downward force being applied by the distributor 117 which is adapted to overtake the knockout valve 105 during its downward movement.

Timing equipment

The timing equipment primarily comprises a cam shaft 520 (Fig. 5) carrying glassworking and hydraulic equipment circuit-control cams 521 to 535, and adapted to be intermittently rotated by a motor 500 having an internal brake.

System operation

When glassforming operations are to be initially started the emergency, hydraulic, and automatic-start contacts 536, 546, and 556 are momentarily closed in succession.

Upon closure of contacts 536, relay 541 becomes energized over a circuit extending from an X terminal of a suitable current source, through contacts 536, the winding of relay 541 to a Y terminal of the same source, and at its inner contacts connects an X terminal of the current source to conductor 555 to close a locking circuit for itself through "emergency" stop contacts 537. Relay 541 at its break contacts opens a point in an operating circuit for the magnet 237 of the low-speed control valve 236, and at its outer make contacts closes a point in an alternative operating circuit for this magnet.

Upon closure of contacts 546, a circuit for relay 545 is completed through contacts 547 and the inner contacts of relay 541. Relay 545 accordingly operates, and at its inner contacts completes a locking circuit for itself independently of contacts 546, and at its outer contacts closes a circuit over conductor 513 to motor 202, thereby starting the hydraulic system.

Upon closure of contacts 556, since an X terminal of the current source is now connected to conductor 555, relay 552 becomes energized and completes a locking circuit for itself from conductor 555 through its right contacts (as viewed in Fig. 5), conductor 502, valve contacts 163, conductors 503 and 503a, and contacts 557. A branch of this circuit extends over conductor 502 to conductor 550, through contacts of cam 527 to conductor 506, and through the magnet of valve 160 to a Y terminal of the current source so that valve 160 opens to direct air into the top of mold 101.

Relay 552 also closes a point in the operating circuit of timer start relay 540. This circuit extends from a branch of conductor 555 through contacts of timer stop cam 521, the left contacts of relay 552 (as viewed in Fig. 5), conductor 508, feeder-actuated contacts 194, conductor 507, and through relay 540 to a Y terminal of the current source.

For the purpose of describing the sequence of operations brought about by cams 521 to 535, it is arbitrarily assumed that their peripheries are divided into fifty segments or positions numbered counterclockwise; that the lobe on stop cam 521 occupies the space of segment 49 which, in the position shown in Fig. 1, has passed the distance of ½ segment width beyond its associated contact-spring actuating lobe, herein referred to as position 49½. The lobes of the remaining cams are located along different segments or positions, as set forth in the following cam-setting table and as designated by the numerals placed within the confines of the respective cams:

*Cam setting*

527—Top air, contacts close at 47½ to ½.
524—Low speed stop, contacts close at ½.
529—Vacuum, contacts close at ½ to 18½.
534—Valve 105 down, contacts close at 1.
532—Distributor down, contacts close at 2½.
525—High speed start, contacts close at 4.
526—High speed stop, contacts open at 11.
530—Trimmer in, contacts close at 12.
523—Low speed start, contacts close at 12½.
533—Distributor up, contacts close at 13.
531—Trimmer out, contacts close at 15.
527—Top air, contacts close at 15 to 35.
524—Low speed stop, contacts close at 38.
535—Valve 105 up, contacts close at 39.
522—Safety, contacts open at 45.
528—Bottom air, contacts close at 47 to 49.
523—Low speed start, contacts close at 47.
521—Timer stop, contacts open at 49.

When the timing device T (Fig. 1) starts a feeding cycle, as already described, contacts 194 momentarily close and complete the traced circuit for start relay 540 (Fig. 5) of the timing equipment. Relay 540, at its lower contacts, completes a locking circuit for itself through timer-stop contacts 567 and the contacts of timer stop cam 521, and at its upper contacts closes the circuit of motor 500. Shaft 520 is accordingly turned, but before quite completing one revolution, the locking circuit of relay 540 is opened by the contacts of cam 521, so that the relay 540 restores and opens the circuit of motor 500. By the time actual stopping of shaft 520 occurs, the contacts of cam 521 are again closed.

At the commencement of the turning movement of cams 521—535, cam 527 opens the previously traced operating circuit through the magnet of top cooling air-control valve 160, and the contacts of cam 524 momentarily close the alternative circuit for magnet 237 of the four-way low-speed control valve 236, thus actuating this valve to stop the low-speed operation of mold 101. This circuit extends from conductor 550, to which an X terminal has been connected, as already described, through the contacts of cam 524, conductor 517a, the front contacts of relay 541 to conductor 517, and through magnet 237 to a Y terminal of the current source.

As the shaft 520 continues to turn, cam 529, in moving from position ½, at its contacts completes a circuit for the magnet of vacuum-control valve 157 to apply vacuum to the tubular portion of mold 101 which is about to receive, or has just received, a mold charge 600 (Fig. 6), and maintains the circuit closed until position 18½ is passed. The above circuit extends from conductor 550 which, as already described, has an X terminal of the current source connected thereto, through the contacts of cam 529, conductor 504, and the magnet of valve 157 to a Y terminal. With vacuum applied, the charge at the time of deposit appears substantially as shown in Fig. 6.

Cam 534, in position 1, at its contacts completes a circuit for magnet 240 of the knockout valve-control four-way valve 235, which operates to feed fluid to the top end of unit 108 to initiate the downward movement of knockout valve 105. The circuit for magnet 240 extends over conductor 510 direct to magnet 240.

In position 2½ cam 532 closes its contacts, completing a circuit through conductor 514 direct to magnet 227 of the four-way distributor control valve 233. This valve accordingly operates to supply fluid to the top end of unit 121 to lower the distributor 117.

Cam 525, in passing through position 4, at its contacts directly closes a circuit through a switch 542 for a high-speed start relay 560 which connects the live conductor 550 and conductor 518 through the contacts of stop cam 526 to lock relay 560 energized independently of the contacts of cam 525. Relay 560, by connecting conductor 550 to conductor 518, also completes a circuit for the magnet 219 of the high-speed pilot valve 218 which, as already described, starts the high-speed operation of motor 113 to centrifugally form an article.

By the time the distributor 117 comes into engagement with the charge 600, part of the molten glass has already been drawn into the tubular portion of the mold by the previous creation of a negative pressure therein, and the glass charge itself has attained the article form illustrated in Fig. 7. A few seconds later centrifugal development of the article is completed to the form shown in Fig. 8, by which time the distributor has reached the limit of its downward travel. During its movement through the tubular portion of the mold, the glass drawn thereinto is subjected to lateral extrusion between the distributor 117 and the valve 105 and is distributed along the wall thereof to form the tubulation with the aid of the centrifugal force generated by the rotation of the mold. The distributor is not only moved downward at a speed greater than that at which the valve is withdrawn by hydraulic unit 108, but, because of the diminishing mass of glass between the valve and itself, continues to be moved downward at a somewhat greater speed than the valve after it contacts the glass drawn into the tubular portion. In the brief period immediately following the halting of the downward movement of the distributor, valve 105 travels to its final position, illustrated in Fig. 9. During this final stage of downward movement of valve 105, owing to the differential pressure between opposite sides of the portion of glass 601 (Fig. 8) as a result of the establishment of a negative pressure on its underside and atmospheric pressure on its topside, effected by the provision of perforations 119 in the distributor, the glass is blown free of the distributor and to the form illustrated in Fig. 9.

In position 11, cam 526 opens its contacts to discontinue the high-speed operation of motor 113 by interrupting the traced circuit of relay 560 which, upon becoming de-energized, opens the circuit of the magnet 219 of pilot valve 218, enabling it to effect the restoration of valve 211 to cut off the supply of fluid to motor 113.

In position 12, cam 530 connects conductor 550 via a switch 544 to conductor 512 extending to magnet 268 of the four-way control valve 234, which operates to supply fluid to trimmer unit 147 to move disc 130 into the "trim" position.

In position 12½, cam 523 at its contacts connects conductor 550 to conductor 516, thus completing a circuit for magnet 238 of the low-speed control valve 236, which operates to again feed fluid from pump 204 to motor 113 to keep it rotating at low speed during the operation of the trimmer unit.

In position 13, cam 533 at its contacts connects conductor 550 to conductor 515, thus completing a circuit for magnet 228 of the distributor control valve 233, which operates to reverse the fluid connections to unit 121 and thus cause it to raise distributor 117 to its initial position.

In position 15, cam 531 at its contacts connects conductor 550 to conductor 511 to complete a circuit direct to magnet 269 of valve 234, which accordingly operates to reverse the connections to unit 147 to move the trimmer disc 130 to its "out" position, illustrated in Fig. 1.

In positions 15 to 35, cam 527 at its contacts again completes the circuit traced through the magnet of valve 160 to supply cooling air to the top of mold 101 and to the glass article therein to free the article from the mold as already explained.

In position 38, cam 524 again closes the traced circuit through magnet 237 to stop the low-speed operation of motor 113.

In position 39, cam 535 closes a circuit from conductor 550 through conductor 509 to magnet 239 of valve 235 to reverse the fluid connections to unit 198 and thus restore the knockout valve 105 to its initial position, and in so doing, elevate the finished article to a height convenient for its removal from the mold 101.

In position 45, cam 522, at its contacts, opens the circuit of safety relay 552 only if, for some reason, the valve shaft 106 has failed to reach its "up" position. Under these circumstances it becomes necessary to close contacts 556 to pick up relay 552. If, however, the valve 105 is in its "up" position, relay 552 is held energized over its alternative circuit, including valve contacts 163, to permit automatic operation of the system to continue under control of the timer T.

In positions 47 to 49, cam 528 at its contacts connects conductor 550 to conductor 505 to energize the magnet of valve 159 which opens to supply air to the bore of the tubular portion 103 of the mold to flush out any glass particles which may remain following removal of an article from the mold.

In passing through position 47, the contacts of cam 523 again close to reinitiate the slow-speed operation of motor 113.

In position 47½ to position ½, the contacts of cam 527 are closed to energize the magnet of valve 160 to open it to effect cooling of the mold as it rotates at low speed between operating cycles of the timing equipment.

As already described, as the cam 521 passes through position 49, the circuit of start relay 540 is interrupted to stop the rotation of shaft 520 with the cams in the position shown; namely, in position 49½.

When the feeder is idle, a cycle of operation of the remaining equipment can be initiated by a momentary closing of contacts 566. Instantaneous stopping of the timing equipment can be effected by momentarily opening contacts 567 to release relay 540.

Automatic operation of the timing equipment can be discontinued at the termination of an operating cycle by momentarily opening contacts 557 to release relay 552.

Operation of the hydraulic equipment can be discontinued at will by momentarily opening contacts 547 to release relay 545.

As will be apparent, in any emergency the entire system can be disabled by opening emergency-stop contacts 537 to release relay 541 to disconnect the Y terminal of the current source from conductor 555, thus causing relays 540, 545, 552, and 560 to also restore.

Preliminary to starting actual production it is desirable to rotate the mold with glass therein in order to heat the mold to a temperature suitable for satisfactory production. Under these circumstances switch 542 is moved to the alternative position thus transferring the energizing circuit of the high-speed relay 560 from the control of contacts of cam 525 to a circuit extending over conductor 501, through the contacts 104, conductor 502 and conductor 550. This circuit is not closed until the valve 105 has been lowered substantially to permit glass from a deposited charge to be drawn into the bore of tubular mold portion 103 before high speed rotation of the mold can begin. A switch 543 in the circuit of magnet 227 of valve 233 may also be moved to its open position to prevent lowering of the distributor 117 during the warming-up operation. Also, during the warming-up operation there is no need to operate the trimmer, and accordingly, switch 544 may be opened to prevent operation of the trimmer assembly.

While rotation of mold 101 in the described sequence of operations is initiated after the charge of molten glass has been deposited therein, it is apparent that the mold may be rotating as the gob is fed thereto. In either event, the forcing of a part of the glass charge into the bore of tubular portion 103 positively anchors the charge in place in the mold throughout the centrifugal formation of the article. Preferably, the temperature relation of the glass charge to the mold is such that a thin shell or skin of chilled glass can form adjacent the mold wall, and the present operations are desirably so carried out as to permit such shell of chilled glass to form prior to the centrifugal distribution or extrusion of the remaining molten glass over the chilled glass shell onto the remainder of the mold wall.

Where a tubular article in contradistinction to a tubulated article is to be formed, the mold 101 may be employed, only the tubular portion 103 thereof being utilized in the formation of the article. In such case, since there is to be no flared or funnel portion, the size of the charge is adjusted accordingly so that all or substantially all of the molten glass is introduced into the tubular portion of the mold. Formation of the tubular article is effected by subjecting the glass during its longitudinal movement through the mold to lateral extrusion and by exerting a centrifugal force thereon by rotation of the mold, which, however, may remain stationary or substantially so during the extrusion of the glass if desired. Obviously simple tubular molds may be substituted for mold 101, and the described trimming operation may be unnecessary.

Regardless of the type of article being formed, the molten glass can be worked at a lower viscosity than possible in conventional blowing or pressing, with a consequent improvement in the quality of the product obtained. Moreover, less glass is required in the formation of the article with an attendant saving in cost and undesirable weight.

*Article severing*

The timing of the operation of the trimmer assembly and the pressure applied to disc 130 can be readily adjusted to groove the article to any desired depth. In fact, complete separation in the mold by the disc can be accomplished if desired. It is usually preferable, however, to form the groove to a depth of somewhat over half the article wall thickness and to effect complete severance by thermal shear, i. e., mechanical shear introduced by a thermal gradient, after removal of the article from the mold, as more fully described in the aforementioned copending application Serial No. 107,946. When an article is grooved in the latter fashion, the ring of cullet cools more rapidly than does the article, and in cooling shrinks sufficiently to effect thermal shear along the groove. Irrespective of whether thermal shear occurs before or after removal of the article from the mold, the article is placed in inverted position on a lehr belt and passed through an annealing lehr. If thermal shear has not been effected, the lehr belt tends to hold the temperature of the ring of cullet high while the article is cooling and severance by thermal shear is effected in the lehr.

I claim:

1. The method of forming a hollow glass article having a tubulation, which includes introducing a charge of molten glass into a mold having a hollow portion and a communicating tubular portion with such glass charge arranged across the junction of the tubular portion and the hollow portion, rotating the mold about the axis of its tubular portion to centrifugally distribute part of the glass charge over the wall of the hollow portion, applying pressure to the part of the glass charge over the tubular portion to advance glass therein, and subjecting such glass during such advancement to a yieldingly opposing pressure to effect annular extrusion of glass in tubular form.

2. The method as claimed in claim 1, in which the pressure is applied by means of a distributing tool introduced into such portion.

3. The method of forming a hollow glass article having a tubulation, which includes introducing a charge of molten glass into a mold having a hollow portion and a communicating tubular portion, positioning the glass charge across the junction of the tubular portion and the hollow portion, rotating the mold about the axis of its tubular portion to centrifugally distribute part of the glass charge over the wall of the hollow portion, creating a pressure differential between opposite sides of the glass charge to force glass into the tubular portion, applying a positive pressure to such glass to advance it in the tubular portion, and subjecting such glass during such advancement to a yieldingly opposing pressure to effect annular extrusion of glass in tubular form.

4. The method as claimed in claim 3, which includes creating a negative pressure in the tubular portion.

5. The method as claimed in claim 3, in which the positive pressure is applied by means of a distributing tool introduced into the tubular portion.

6. The method of forming a hollow glass article having a tubulation, which includes introducing a charge of molten glass of a viscosity flowable by gravity into a mold having a hollow portion and a communicating tubular portion, positioning the glass charge over the junction of the tubular portion and the hollow portion whereby a part of such charge can flow into the tubular portion, rotating the mold about the axis of the tubular portion to centrifugally distribute part of the glass charge over the wall of the hollow portion, applying a positive pressure to the part of the glass charge entering the tubular portion to advance it therein, and subjecting such part of the glass charge during such advancement to a yieldingly opposing pressure to effect annular extrusion of the glass in tubular form.

7. The method as claimed in claim 6, in which the positive pressure is applied by means of a distributing tool introduced into the tubular portion.

8. The method of forming a hollow glass article having a tubulation, which includes introducing a charge of molten glass into a mold having a hollow portion and a communicating tubular portion provided with a movable obstruction, positioning the glass charge across the junction of the tubular portion and the hollow portion, rotating the mold about the axis of its tubular portion to centrifugally distribute part of the glass charge over the wall of the hollow portion, withdrawing the obstruction into the tubular portion while creating a pressure differential between opposite sides of the glass charge to force glass thereinto as withdrawal of the obstruction proceeds, and pressing such glass against the obstruction as it is being withdrawn to effect annular extrusion of glass in tubular form with the aid of the centrifugal force generated by the rotation of the mold.

9. The method as claimed in claim 8, in which the glass is pressed against the obstruction by means of a distributing tool introduced into the tubular portion.

10. The method as claimed in claim 9, which includes discontinuing the movement of the distributing tool following the annular extrusion of glass while continuing the withdrawal of the obstruction to free the tool from the glass.

11. The method as claimed in claim 10, which includes the further steps of removing the distributing tool from the mold and restoring the obstruction to its initial position to eject the article from the mold.

12. The method of forming a generally conically shaped hollow glass article tubular at its apex, which includes introducing a charge of molten glass of a viscosity flowable by gravity into a mold having a generally conically shaped hollow portion and a tubular portion communicating with such hollow portion at its apex, the glass charge being positioned over the junction of the tubular portion and the hollow portion whereby glass from such charge can flow into the tubular portion, rotating the mold about the axis of its tubular portion to centrifugally distribute part of the glass charge over the wall of its hollow portion, and advancing a tool downwardly into the tubular portion in contact with the glass therein.

13. The method as claimed in claim 12, in which the tool is advanced into the tubular portion during centrifugal distribution of glass over the wall of the hollow portion.

14. The method as claimed in claim 12, which includes creating a negative pressure in the tubular portion to assist the flow of glass thereinto.

15. The method of forming a generally conically shaped hollow glass article tubular at its apex, which includes introducing a charge of molten glass of a viscosity flowable by gravity into a mold having a generally conically shaped hollow portion and a tubular portion communicating with such hollow portion at its apex, the glass charge being positioned over the junction of the tubular portion and the hollow portion whereby glass from such charge can flow into the tubular portion, providing an obstruction in such tubular portion to restrict the amount of glass flowing thereinto, rotating the mold about the axis of its tubular portion to centrifugally distribute part of the glass charge over the wall of its hollow portion, and annularly extruding glass accumulated within the tubular portion by advancing a glass-distributing tool downwardly therein against such obstruction during rotation of the mold.

16. The method of forming a hollow glass article having a tubulation, which comprises supplying a charge of molten glass of a viscosity flowable by gravity to the junction of the funnel-forming cavity and of the depending tube-forming cavity of a funnel-tube mold whereby glass from such charge flows downwardly into the tube-forming cavity and concurrently centrifugally distributing a part of the charge upwardly over the funnel-forming cavity in funnel form against the action of gravity by rotating the mold about the axis of its tube-forming cavity with such axis arranged vertically and shaping glass that has flowed downwardly into the tube-forming cavity into tubular form integral with the glass in the funnel-forming cavity.

17. The method as claimed in claim 16 which includes controlling the downward flow of glass into the tube-forming cavity.

18. The method of forming a hollow glass article having a tubulation, which comprises depositing a charge of molten glass into a mold having a hollow portion and a communicating tubular portion across the junction of such portions, introducing a part of the charge into the bore of the tubular portion, rotating the mold about the axis of its tubular portion to centrifugally distribute the balance of the charge over the wall of the hollow portion, and advancing a glass-distributing tool into such tubular portion in contact with the glass therein to impart the desired tubular shape to the article.

19. The method of forming a hollow glass article having a tubulation, which includes introducing a charge of molten glass of a viscosity flowable by gravity into a mold having a hollow portion and a communicating tubular portion, the temperature of the mold being substantially lower than the initial temperature of the glass charge, positioning the glass charge across the junction of the tubular portion and the hollow portion whereby a part of such charge is in a position to flow into the tubular portion and whereby a thin shell of chilled glass is formed on the portion of the glass charge adjacent the wall of the mold at the junction of the hollow portion and the tubular portion, centrifugally distributing the remaining molten glass over said thin shell of chilled glass onto the remainder of the wall of the hollow portion by rotation of the mold about the axis of its tubular portion, and advancing a glass-distributing tool into the tubular portion in contact with the glass therein to impart the desired tubular shape to the article.

20. The method which includes applying pressure to that portion of one surface of a charge of molten glass inward from the wall of a tubular mold cavity at one end of which cavity such charge is located in a direction to advance it from said end toward the opposite end of such cavity, laterally extruding glass from said charge in tubular form along the wall of such cavity by subjecting the opposite surface thereof during such advancement to a yieldingly opposing pressure and rotating the mold about the axis of its cavity.

21. The method as claimed in 20, which includes maintaining a negative pressure in the cavity during the application of pressure.

22. The method as claimed in claim 20 in which pressure is applied by means of a distributing tool introduced into the cavity.

23. The method of forming a tubular glass article, which includes depositing a molten charge of glass across one end of a hollow mold having a cross-section corresponding to that of the tubular glass article to be formed and onto a movable support substantially flush with such end of the mold, creating a negative pressure within the mold to draw glass thereinto while retracting such support therein, and pressing such glass against the support as it is being retracted to effect annular extrusion of glass in tubular form.

24. The method as claimed in claim 23 in which the glass is pressed against the support by means of a distributing tool introduced into the mold.

25. A glass-forming apparatus which includes a mold having a cavity and a tubular portion of relatively smaller cross-section in communication therewith and arranged with the axis of its tubular portion vertical, means for rotating the mold about the axis of its tubular portion to centrifugally distribute part of a molten glass charge of a viscosity flowable by gravity over the wall of its cavity, means for distributing glass in the tubular portion into tubular shape, said distributing means being normally positioned above and outside said tubular portion, and means for moving said distributing means downwardly into said tubular portion solely in an axial direction.

26. A glass-forming apparatus which includes a mold having a cavity and a tubular portion of relatively smaller cross-section in communication therewith; means for introducing a portion of a molten glass charge deposited within the cavity into the tubular portion, said means including means for creating a negative pressure within the tubular portion, a valve normally substantially flush with the end of the tubular portion adjoining the cavity for limiting the volume of glass introduced into the tubular portion, and associated means for retracting such valve within the tubular portion; means for distributing the glass introduced into the tubular portion in tubular form along the length thereof, and means for rotating the mold about the axis of its tubular portion to centrifugally distribute molten glass over the walls of the cavity and the tubular portion.

27. Apparatus such as defined by claim 26, wherein the distributing means includes a glass-contacting tool and means for moving it into engagement with glass within the tubular portion, said means continuing the movement of such tool to extrude glass from between it and the valve.

28. A glass-forming apparatus which includes a mold having a cavity and a communicating tubular portion of relatively smaller cross-section, means for rotating the mold about the axis of its tubular portion to centrifugally distribute part of a molten glass charge of a viscosity flowable by gravity over the wall of its cavity, means for engaging glass within the tubular portion to move the same therethrough, and means yieldingly opposing the movement of such glass whereby annular extrusion of the glass in tubular form is effected.

29. Apparatus for forming a generally conically shaped hollow glass article tubular at its apex, which includes a mold having a generally conically shaped hollow portion and a tubular portion of relatively smaller cross-section in communication therewith, means for rotating the mold about the axis of its tubular portion to centrifugally distribute part of a molten glass charge of a viscosity flowable by gravity over the wall of is hollow portion, a tool arranged for introduction through the hollow portion into the tubular portion for movement solely in an axial direction through the latter, and means for introducing said tool downwardly into such tubular portion into engagement with glass therein.

30. The apparatus as claimed in claim 29, which includes means for creating a negative pressure within the tubular portion.

31. Apparatus for forming a tubular glass article, which includes a mold having a tubular passage, means for engaging molten glass within such passage to move the same from one end toward the opposite end thereof, means yieldingly opposing the movement of such glass whereby annular extrusion of glass in tubular form is effected, and means to rotate the mold about the axis of the passage.

32. In a glass-forming apparatus, a mold having a tubular passage, a valve normally substantially closing the passage at one end thereof, means for retracting said valve within the passage and for subsequently restoring said valve to its initial position, means for creating a negative pressure in the passage to draw thereinto molten glass from a charge deposited across the end thereof, a distributor of a cross-section less than that of the tubular passage for introduction into said passage, and means for advancing said distributor into engagement with glass in the passage and for continuing such advancing movement at a speed greater than that at which said valve is retracted by its operating means whereby glass is extruded from between said distributor and valve lengthwise along the wall of the passage.

33. The apparatus as claimed in claim 32, which includes means to rotate the mold about the axis of the passage therein.

34. A glass-forming apparatus such as defined by claim 32, wherein the means for operating the valve and the means for operating the distributor are fluid-operated.

35. In a glassworking system, a mold having a tubular passage, a valve in said passage movable between normal and alternative positions therewithin, means normally maintaining said valve in its normal position and operable to move said valve back and forth between said positions, other means adapted to apply pressure on said valve in the direction of its movement during its travel toward its alternative position, and means to rotate the mold about the axis of the passage, 36. In a glassworking system, a mold having a tubular passage, means for rotating said mold about the axis of said passage, a valve within said mold passage, glassworking tools adapted for movement into and out of said mold, means for operating said valve and one of said tools in timed and cooperative relation to aid centrifugal action in forming an article in said mold, and means for moving another of said tools into engagement with the article during subsequent rotation of said mold.

37. In a glassworking system such as defined by the preceding claim, wherein at least one of said tool-operating means is fluid-operated.

38. In a glassworking system, a mold having a tubular passage, means for rotating said mold about the axis of said passage, glassworking tools adapted for movement into and out of said mold, means for operating one of said tools to aid centrifugal action in forming an article in said mold, and means for moving another of said tools into engagement with the article during subsequent rotation of said mold.

39. In a glassworking system, a mold, a fluid-operated motor for rotating said mold, a glassworking tool associated with said mold, a fluid-operated unit for bringing said tool into and out of contact with glass contained in said mold, fluid control valves for said motor and unit respectively, means for supplying operating fluid to said motor and said unit via their respective control valves, individual means for actuating each of said valves, and timing equipment under whose control said valve-actuating means are operated in a desired sequence.

40. In a glassworking system, a mold, a fluid-operated motor for rotating said mold, a glassworking tool associated with said mold, a fluid-operated unit for bringing said tool into and out of contact with glass contained in said mold, fluid control valves for said motor and unit respectively, means for supplying operating fluid to said motor via its control valve, separate means for supplying operating fluid to said unit via its control valve, individual means for actuating each of said valves, and timing equipment under whose control said valve-actuating means are operated in a desired sequence.

JAMES W. GIFFEN.

References Cited in the file of this patent

UNITED STATES PATENTS

| Number | Name | Date |
|---|---|---|
| 157,611 | King | Dec. 8, 1874 |
| 196,326 | Beck | Oct. 23, 1877 |
| 1,208,978 | Kadow | Dec. 19, 1916 |
| 1,377,372 | Thompson | May 10, 1921 |
| 1,523,157 | Amsler | Jan. 13, 1925 |
| 1,637,452 | Nelson | Aug. 2, 1927 |
| 1,760,999 | Tucker et al. | June 3, 1930 |
| 1,859,957 | Canfield | May 24, 1932 |
| 2,198,750 | Winder | Apr. 30, 1940 |
| 2,349,046 | Luertzing | May 16, 1944 |
| 2,350,052 | Luertzing | May 30, 1944 |
| 2,366,118 | Luertzing | Dec. 26, 1944 |

FOREIGN PATENTS

| Number | Country | Date |
|---|---|---|
| 7,514 | Great Britain | A. D. 1890 |
| 23,348/29 | Australia | Oct. 20, 1930 |
| 424,525 | France | Mar. 16, 1911 |
| 540,229 | Great Britain | Oct. 9, 1941 |